US006433265B1

(12) United States Patent
McConville

(10) Patent No.: US 6,433,265 B1
(45) Date of Patent: Aug. 13, 2002

(54) STRINGED INSTRUMENT WORKSTATION

(76) Inventor: Michael Edward McConville, 69 Waterloo Street North, Stratford, Ontario (CA), N5A 5H8

( * ) Notice: Subject to any disclaimer, the term of this patent is extended or adjusted under 35 U.S.C. 154(b) by 0 days.

(21) Appl. No.: 09/050,094

(22) Filed: Mar. 30, 1998

(51) Int. Cl.[7] .................................................. G01D 3/00
(52) U.S. Cl. ........................................... 84/327; 84/453
(58) Field of Search ........................ 84/327, 453; 108/1, 108/92, 121; 248/166, 176.1, 461

(56) References Cited

U.S. PATENT DOCUMENTS

| | | | | | |
|---|---|---|---|---|---|
| 157,141 | A | * | 11/1874 | Stellman | 248/166 |
| 890,311 | A | * | 6/1908 | Stockham | 108/92 |
| 1,652,774 | A | * | 12/1927 | Fraser et al. | 108/92 |
| 1,684,912 | A | | 9/1928 | Dunklau | 84/327 |
| 1,772,308 | A | | 8/1930 | Ezzelle | 84/327 |
| 2,522,345 | A | * | 9/1950 | Cashiopp | 248/121 |
| 3,737,137 | A | | 6/1973 | Sheehan | 248/441 |
| 3,923,356 | A | * | 12/1975 | Washburne | 312/241 |
| 3,958,786 | A | | 5/1976 | Mann | 248/176 |
| 4,335,765 | A | * | 6/1982 | Murphy | 144/286 R |
| 4,708,182 | A | * | 11/1987 | Laker | 144/369 |
| 5,363,734 | A | * | 11/1994 | Wilenken | 84/327 |
| 5,381,717 | A | * | 1/1995 | Brokaw | 84/327 |
| 5,396,824 | A | | 3/1995 | Souza, Jr. | 84/327 |
| 5,470,039 | A | * | 11/1995 | Hilger | 248/164 |
| 5,537,908 | A | * | 7/1996 | Rabe et al. | 84/454 |
| 5,622,344 | A | * | 4/1997 | Gracie | 248/171 |

FOREIGN PATENT DOCUMENTS

| | | | |
|---|---|---|---|
| FR | 3452 | * | 10/1934 |
| GB | 998338 | * | 7/1965 |

OTHER PUBLICATIONS

Product Reviews by Harry Fleishman, Guild of American Lutheries, Spring 1994.

Product Reviews by Harry Fleishman, Guild of American Lutheries.

Stewart MacDonals's Guitar Shop Supply Autumn 1997 Catalog, pp. 3, 13, and 15; Autumn 1992 Catalog, pp. 4 and 5.

Nashville cats: visiting Gibson's repair team, Trade Secrets, vol. 32, pp. 48, 49 and 50.

* cited by examiner

*Primary Examiner*—Shih-Yung Hsieh
(74) *Attorney, Agent, or Firm*—Arne I. Fors

(57) ABSTRACT

A stringed instrument repair station has a frame, a body support member, and first and second neck support member, all adapted for supporting a stringed musical Instrument during manufacture, repair, or on-going maintenance. The body support member is pivotally coupled to the frame member and supported by first adjustable support member. The first neck support member is pivotally coupled to the frame member and supported by second adjustable support member, such neck support member being capable of being positioned at varying angles relative to the frame member. The second neck support member is pivotally coupled to the frame member and supported by third adjustable support member, such neck support member adapted to support the neck of the stringed musical instrument and capable of being positioned at varying angles relative to the first neck support member. Restraining straps are provided for purposes of securing the stringed musical Instrument to the neck support member or the body platform assembly or both.

19 Claims, 20 Drawing Sheets

STRINGED INSTRUMENT WORKSTATION

FIELD OF THE INVENTION

The present invention relates to a stringed musical instrument supporting device and, more particularly, to a device which supports stringed musical instruments during their manufacture and while being repaired or adjusted.

BACKGROUND OF THE INVENTION

During their manufacture, ongoing maintenance, or repair, stringed musical Instruments are subjected to various forces. Because of their inherent fragility, stringed musical instruments are susceptible to physical damage during repair. Indeed, if excessive stresses are applied to their structure during manufacture, maintenance or repair work, irreparable damage may result. The probability of the outcome is magnified if the musical instrument is not properly supported. For instance, when replacing frets or planing fingerboards on the neck of a stringed instrument, proper support of the neck is essential in order to selectively restrict the natural flexibility of the neck along its length.

A further consideration with respect to the manufacture, maintenance and repair of stringed musical instruments is the orientation of the instrument during such procedures. In order to execute a wide range of manufacture, maintenance and repair work on stringed instruments, the instrument must often be manipulated into various positions to permit access to the particular elements of the instrument must be suspended from its neck to permit the builder or repair person to perform work on the body. In other instances, the instrument must be suspended from its body, to permit complete access to the neck. At other times, both the body of the instrument, as well as its neck, require direct support on the horizontal or at an angle from the horizontal to permit ease of access to various components of the instrument.

Accordingly, there is a need for device to safely support stringed musical Instruments at various positions of orientation while manufacture, maintenance or repair work is being performed on such instruments.

SUMMARY OF THE INVENTION

In order to provide a stringed instrument repair station for supporting a stringed musical instrument during manufacture, repair, or on-going maintenance, the present invention provides. In one of its broad aspects, a repair station comprising of a frame, a body support member, wherein the body support member is pivotally coupled to a frame member by an adjustable support means and adapted to support a stringed musical instrument, the adjustable support means being adapted to support the body support member.

In a further broad aspect of the present invention, such repair station comprises a frame member, a body support member, a neck support member, and first and second adjustable support means. The body support member and neck support member are pivotally coupled to the first and second adjustable support means respectively and are adapted to support the body and neck of a stringed musical instrument.

In yet a further broad aspect of the present invention, such repair station comprises a frame member, a body support member, and first and second neck support members. The body support member is pivotally coupled to the frame member and supported by first adjustable support means. The first neck support member is pivotally coupled to the frame member and supported by second adjustable support means, such neck support member being capable of being positioned a varying angles relative to the frame member. The second neck support member is pivotally coupled to the frame member and supported by third adjustable support means, such neck support member adapted to support he neck of the stringed musical instrument and capable of being positioned at varying angles relative to the first neck support member.

In another aspect of the present invention, restraining straps are provided for purposes of securing the stringed musical instrument to the neck support members or the body platform assembly or both.

BRIEF DESCRIPTION OF THE DRAWINGS

Further advantages of the present invention will appear from the following detailed description of the invention, taken together with the following drawings in which.

DETAILED DESCRIPTION OF THE INVENTION

Figure 1:
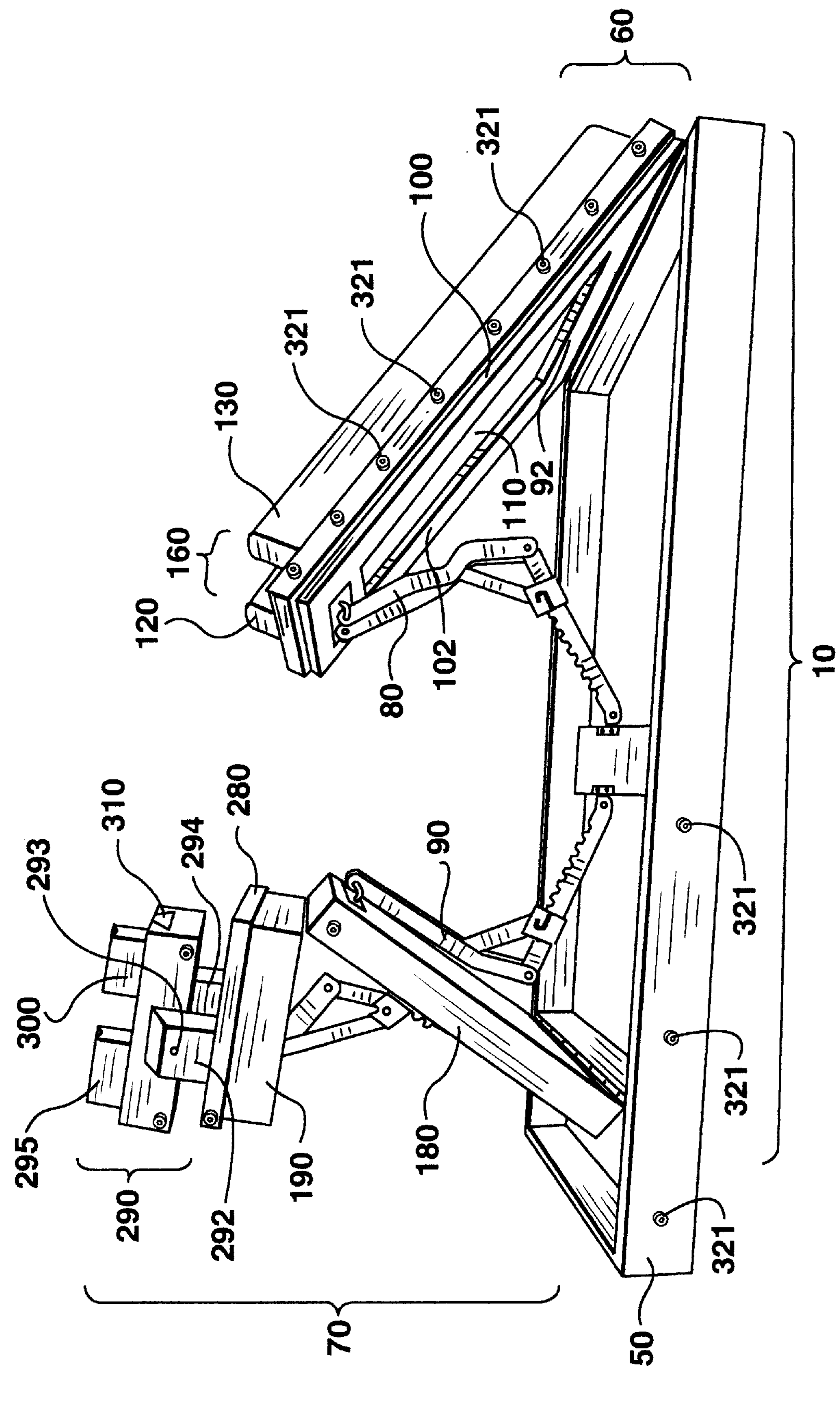
FIG. 1 is a perspective side view of a repair station of the present invention, illustrating a frame member, a body support member and a neck support.
Figure 5:
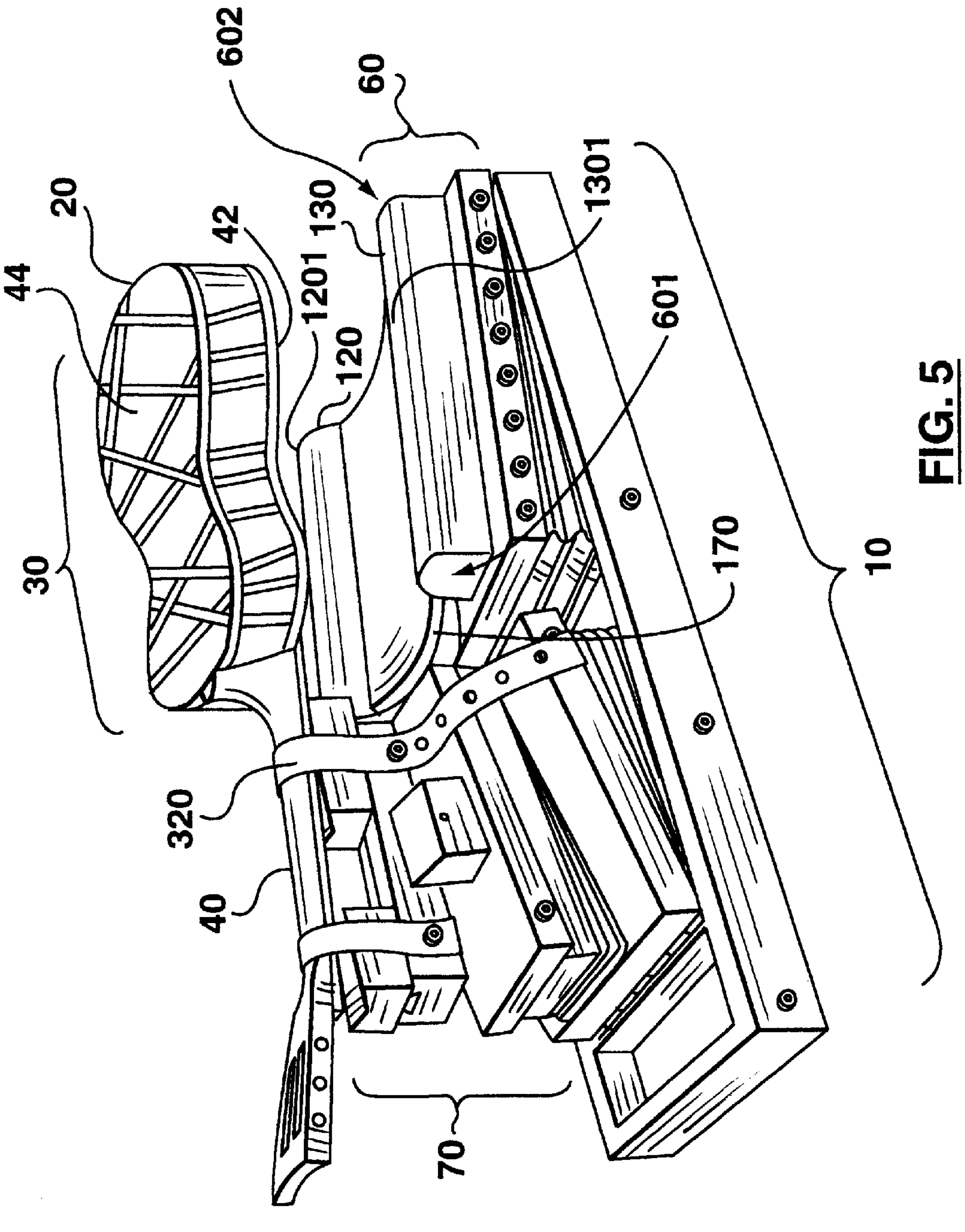
FIG. 5 is a perspective side view of the repair station of FIG. 1 showing a guitar supported by its neck on the neck support member.

FIG. 1 show a stringed musical instrument manufacture and repair device 10, also referred to herein as a "stringed instrument repair station" or a "repair station". It is specifically adapted to support a stringed musical instrument 20 (see for example FIGS. 5, 11 and 12 through 19) during its manufacture or while maintenance or repair is being performed on the instrument. Referring particularly to FIG. 5, the stringed musical instrument 20 is comprised of a body 30 and a neck 40, and has top 42 and back 44 surfaces. A string repair station of the present invention 10 is capable of providing direct support to either of the instrument's body 30 or the instrument's neck 40, or both. The repair station 10 is also capable of supporting the stringed musical instrument 20 at an angle from the horizontal to further facilitate necessary manufacture or necessary maintenance or repair work on the instrument 20 (see for example FIGS. 11, 13 and 18).

As may be seen from FIG. 1, the repair station 10 of the present invention is comprised of a frame member 50, a body support member 60 and a neck support member 70.

Figure 12:
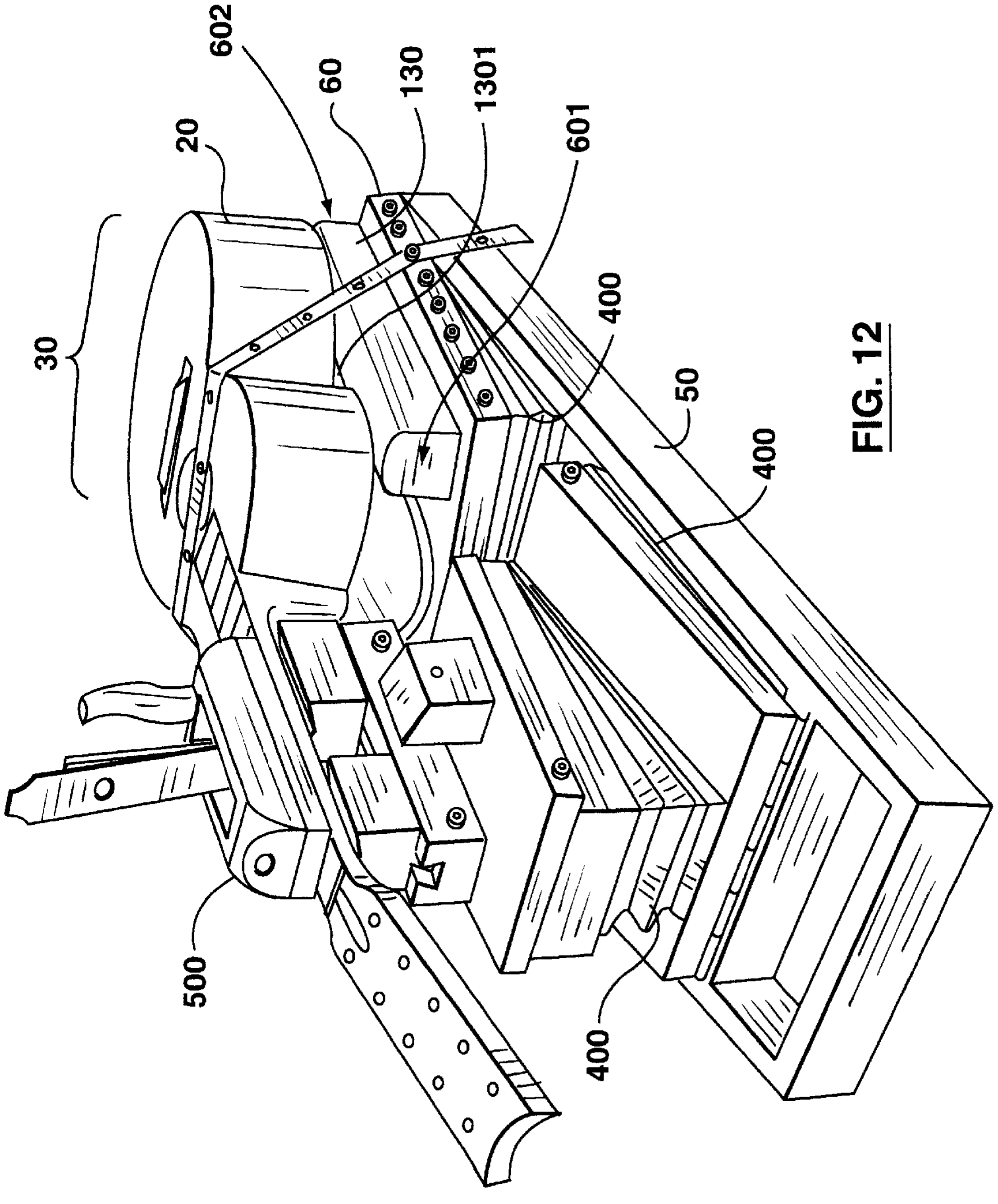
FIG. 12 is an elevated perspective from the neck support end of the repairs station of FIG. 1 showing an acoustic guitar secured with restraining straps to and supported on the repair station for purposes of leveling the finger board with a wood plane.

Referring to FIG. 12, the body support member 60 is adapted to support the body 30 of the stringed musical instrument 20 and pivotally coupled to the frame member 50 and is therefore positionable at varying angles from the horizontal. The pivoting relationship is better illustrated in FIG. 2. In this respect, adjustable support means 80 are provided to support the body support member 60. For example, the adjustable support means 80 is a ratchet-type lift mechanism.

Referring again to FIG. 1, also coupled in pivotal manner to the frame member 50 is a neck support member 70, which is adapted to support the neck of a stringed musical Instrument. In this respect, the neck support member 70 is vertically positionable relative to the frame member 50 to co-operatively support the neck of a stringed musical Instrument at various positions of orientation (see for example FIGS. 12, 18 and 20). The neck support member 70 is supported by second adjustable support means 235. For example, the second adjustable support means 235 is a ratchet-type lift mechanism.

Figure 2:
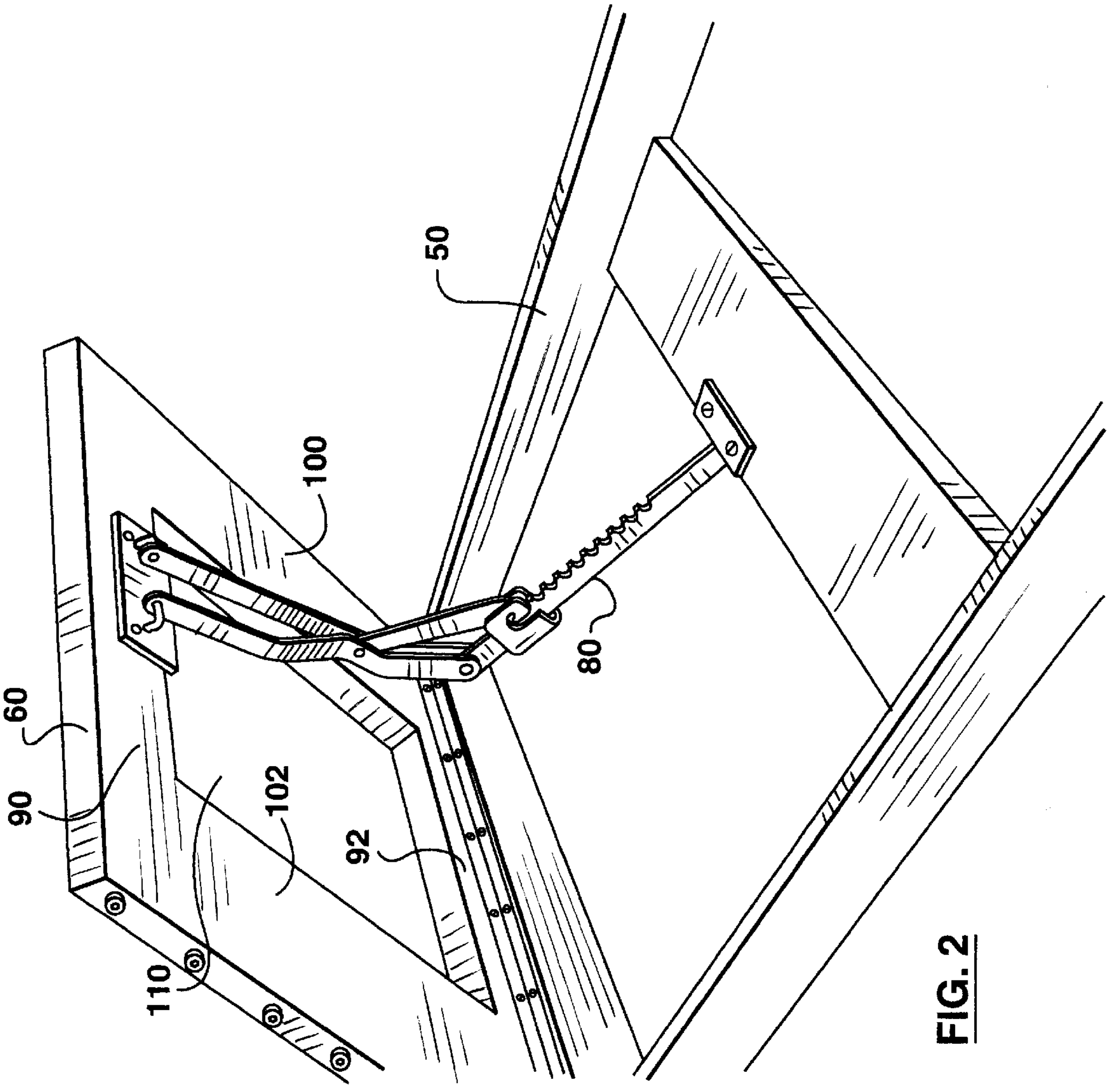
FIG. 2 is a detailed cut-away view of the body support member and its manner of coupling to the frame member of the repair station of FIG. 1.

In one embodiment, as can be seen in FIGS. 1 and 2, the body support member 60 is comprised of four rigid members, front and rear members 90, 92 and left and right side members 100, 102 which together form a substantially quadrilateral sided body support member 60, defining a first free region of space 110. As shown in FIGS. 1 and 5, preferably, a pair of substantially identical vertical sidewall members 120, 130 extend from the surface of each of the left and right side members 100, 102, defining a second free region of space 160 above the body support member 60. The sidewall members 120, 130 are adapted to support the back and top of the stringed musical instrument 20.

The back and top of many stringed musical instruments are slightly convex in shape. As a result, support of such surfaces by a rigid planar supporting surface could potentially damage the instrument. The above-described embodiment of the present invention avoids this situation by providing spaced apart opposing rail members 120, 130 for supporting the back and top of the body of the stringed musical instrument at points proximate to the perimeter of such surfaces, such rail members are adapted to define the above-mentioned second region of free space 180 so as not to interfere with the convex shape of the back or top surface of the body of the stringed musical instrument. In this respect, rail members 120, 130 present upper surfaces 1201, 1301 for providing vertical support to the front side or back side of a stringed musical instrument.

Figure 14:
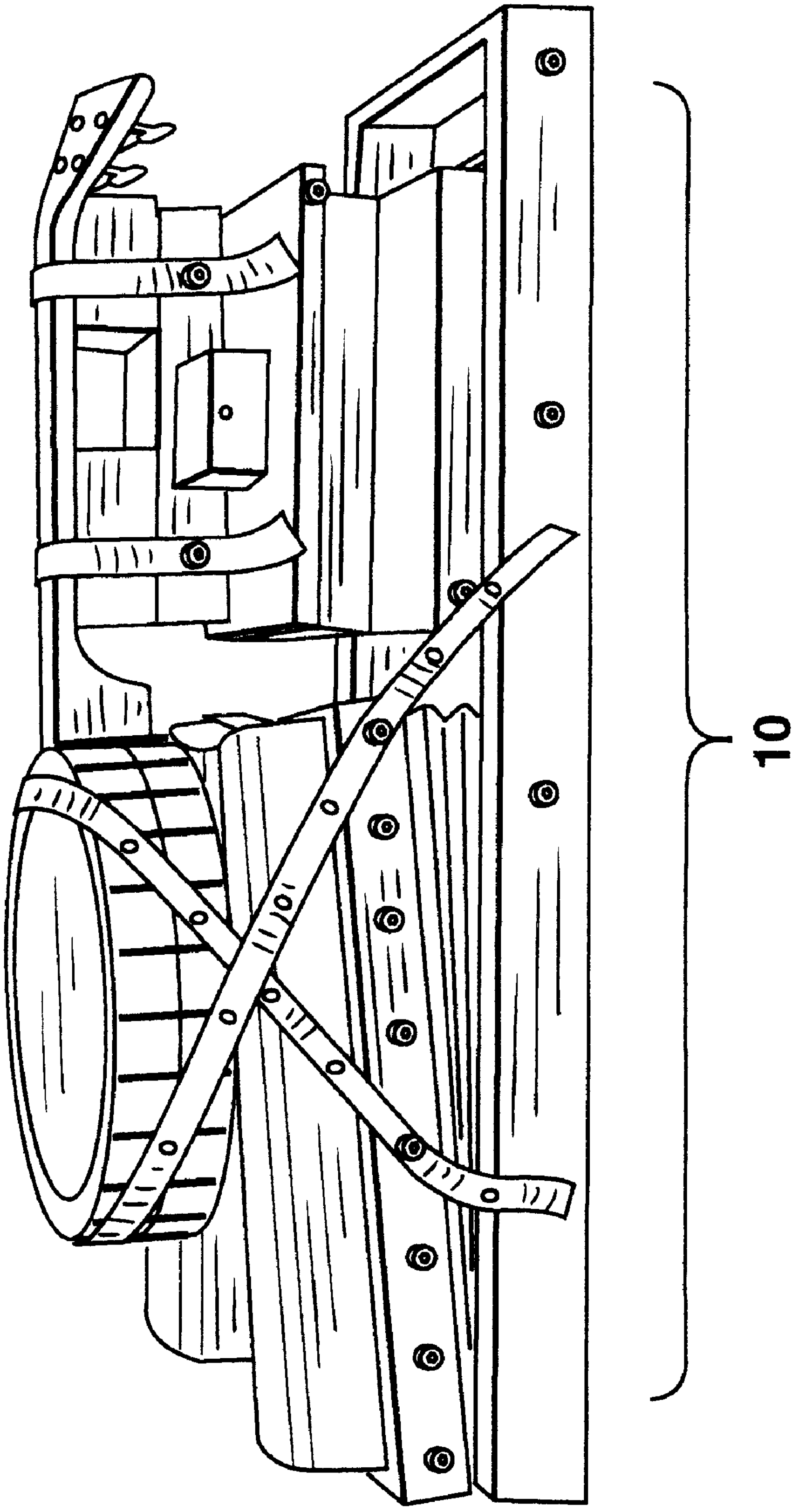
FIG. 14 is a elevated perspective view from the body support end of the repair a banjo secured with restraining straps to and supported on the repair stations.
Figure 15:
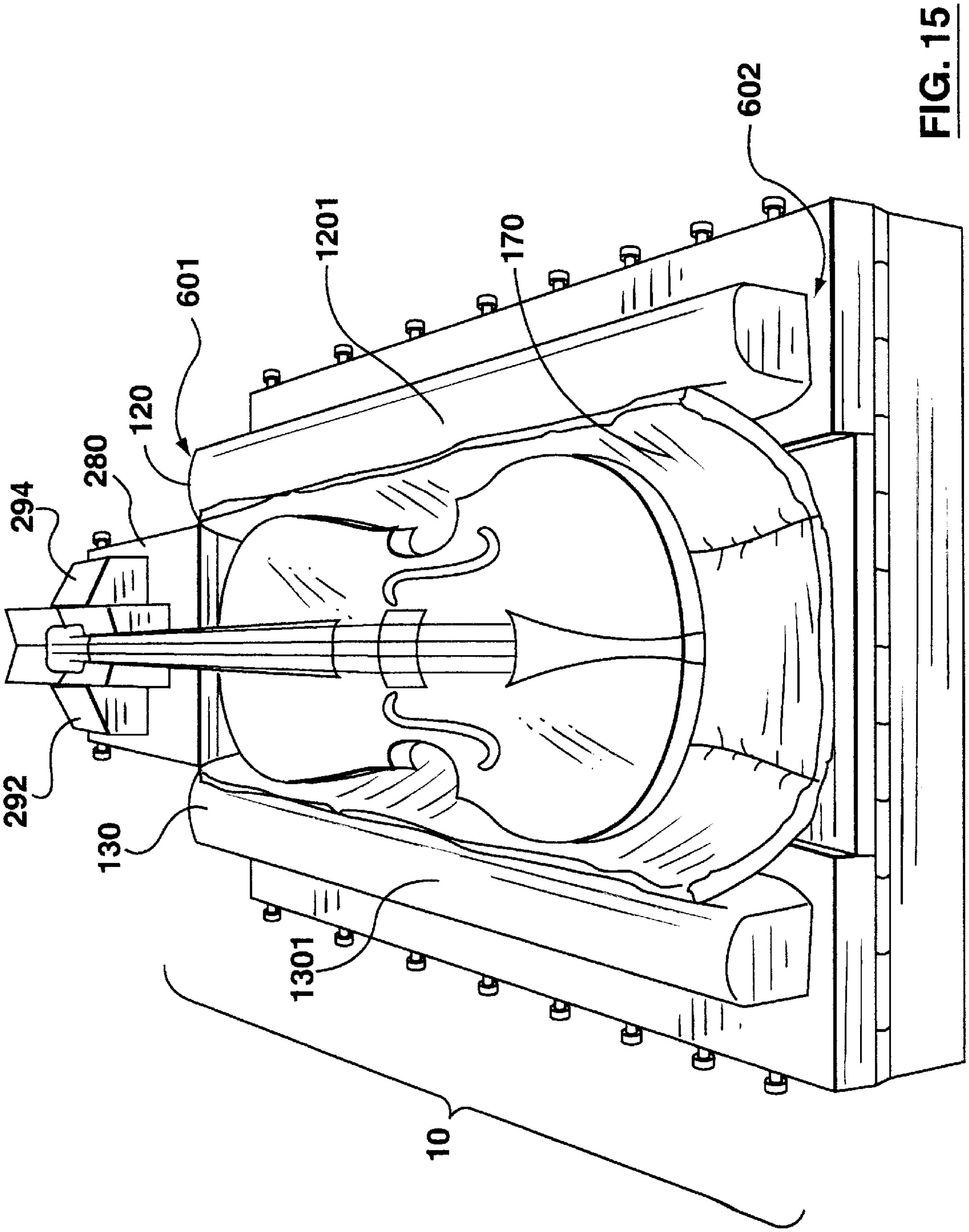
FIG. 15 is an elevated perspective view from the body support end of the repair station of FIG. 1 showing a violin supported on the repair station.
Figure 18:
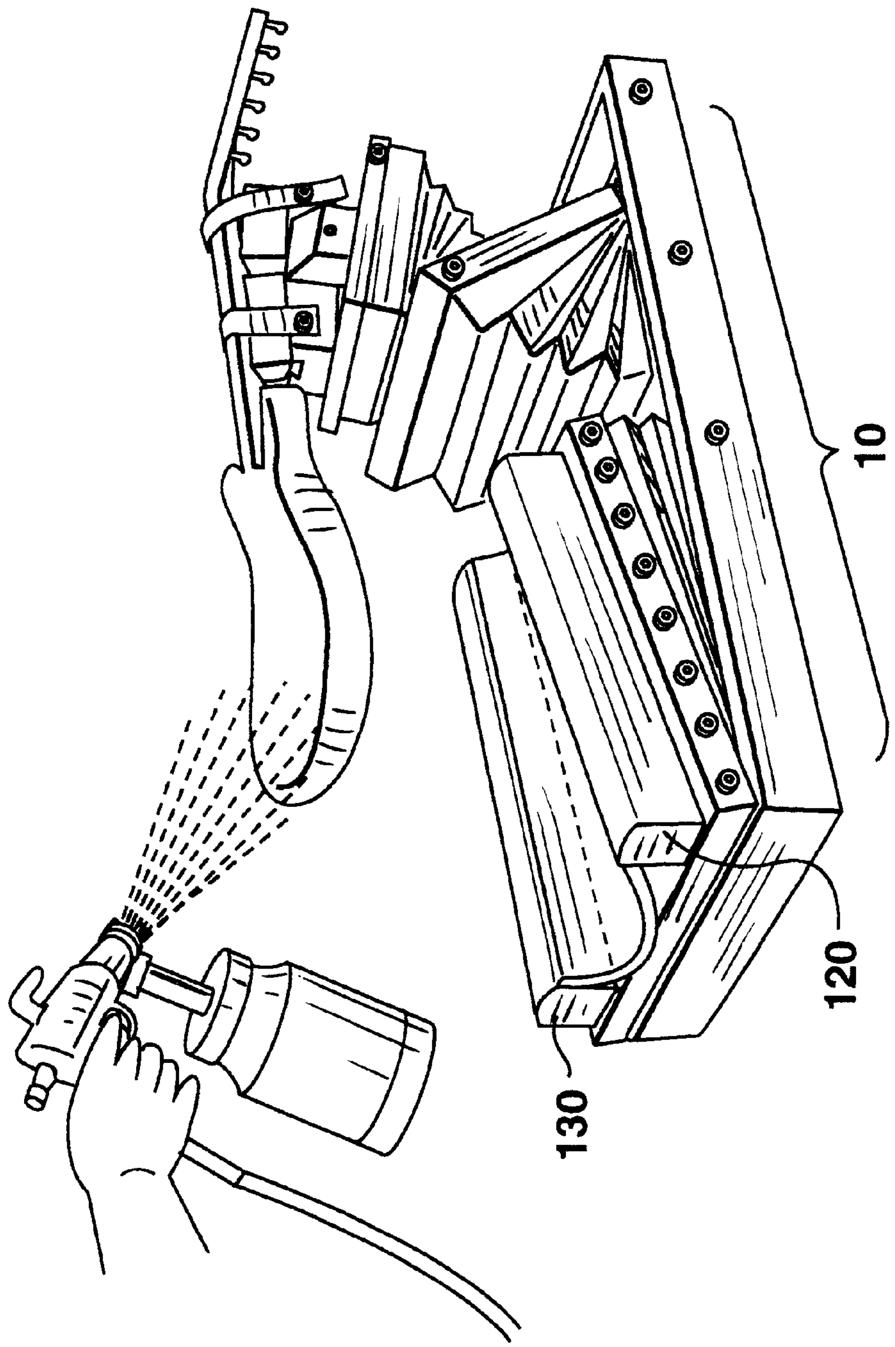
FIG. 18 is an elevated perspective view from the body support end of the repair station of FIG. 1 showing a guitar secured and supported by the repair station illustrating an exemplary setup for purposes of spray finishing the guitar body.

The spaced apart opposing rail members 120, 130 may also be adapted such that a stringed musical instrument could be positioned in the second free region of space 160 and between the spaced apart opposing rail members 120, 130. In this application, the sidewall members would provide lateral support to such stringed musical instrument. In one embodiment, and as illustrated in FIGS. 14, 15, and 18, rail members 120 and 130 are splayed. In this respect, body support member 60 includes a first end 601 and a second end 602. End of rail members 120 and 130 extends from about the first end 601 to about the second end 602, such that the spacing between the first and second rail members 120 and 130 is narrower at the first end 601 than at the second end 602.

Referring to FIG. 5, in further embodiment, an elastic support member 170 is provided within the first free region of space 110. The elastic support member 170 is coupled to the body support member 60 and is adapted to flex under load bearing conditions. As an example, the elastic support member 170 may be constructed of masonite. When manufacture, maintenance, or repair work is performed on the stringed musical instrument 20, and the instrument is supported on its side by the elastic support member 170, any stresses applied to the stringed musical instrument 20 are partially relieved by virtue of the flexion of the elastic support member 170.

Figure 3:
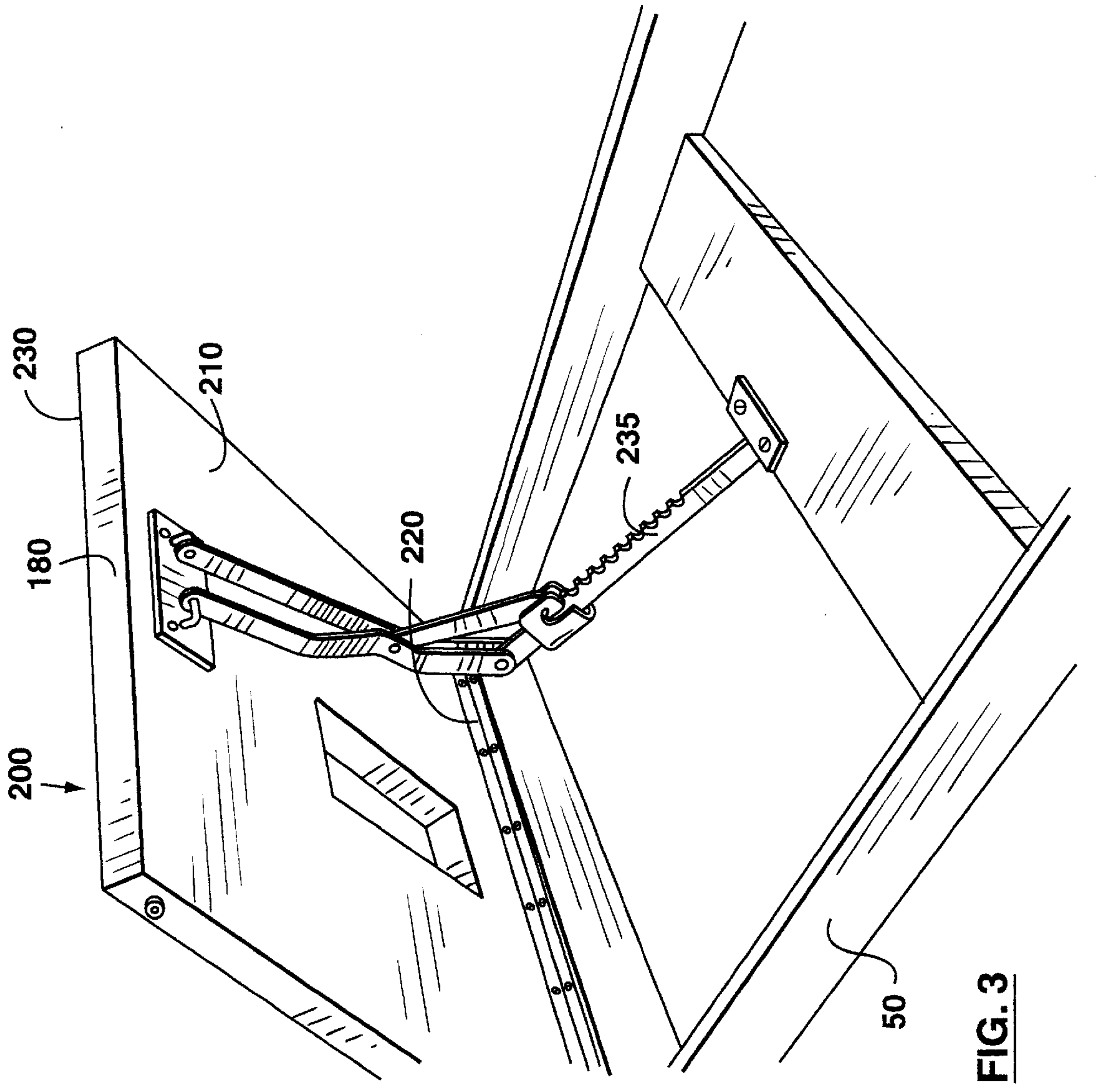
FIG. 3 is a detailed cut-away view of a first neck support member and its manner of coupling to the frame member of the repair station of FIG. 1.

Preferably, the neck support member 70 is comprised of first part and second part neck support members 180, 190, respectively (FIG. 1). Referring to FIG. 3, the first neck support member 180, having upper and lower surfaces 200, 210, is pivotally coupled at one end thereof 220 to the frame member 50, and is further pivotally coupled at opposite end thereof 230 to the second neck support member 190. The lower surface 210 of the first neck support member 180 is pivotally coupled to second adjustable support means 235 provided to support the neck support member 70. For example, second the adjustable support means 235 is a ratchet-type lift mechanism.

Figure 4:
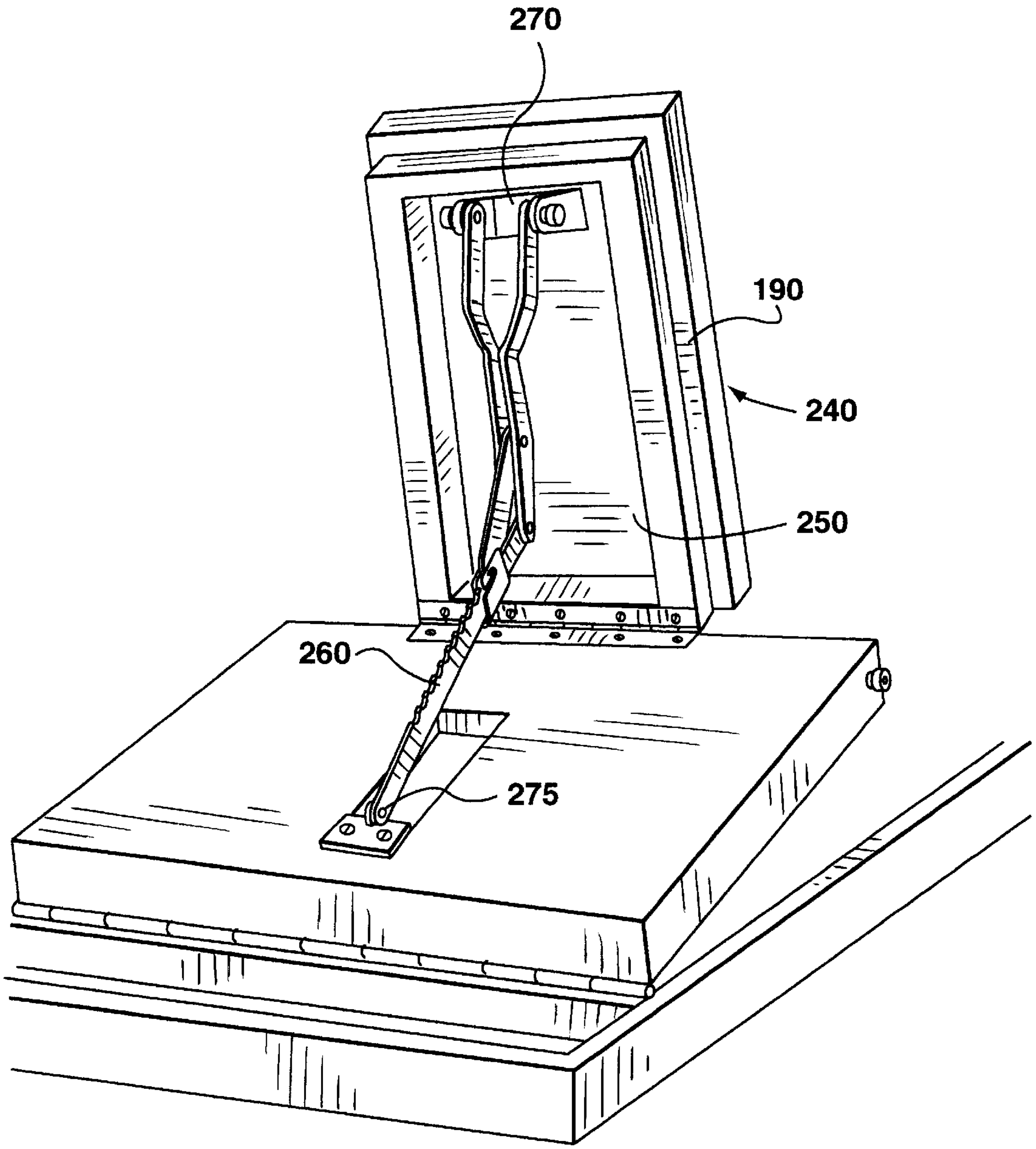
FIG. 4 is a detailed cut-away view of a second neck support member and its manner of coupling to the first neck support member of the neck support of the repair station of FIG. 1.

Referring to FIG. 4, adapted to support the neck of a stringed musical instrument is a second neck support member 190, which comprises upper and lower surfaces 240, 250, and is supported by third adjustable support means 260, for example, a ratchet-type lift mechanism. Preferably, the third adjustable support means 260 are pivotally coupled at one thereof 270 to the lower surface 250 of the second neck support member 190, and is pivotally coupled at opposite end thereof 275 to the upper surface 200 of the first neck support member 180. Such configuration permits the second neck support member 190 to be positionable a varying angles relative to the first neck support member 180.

Referring to FIG. 1, in a further preferred embodiment, the second neck support member 190 further comprises a rigid platform member 280 and positionable support block member 290. The support block member 290 is pivotally coupled to the platform member 280 permit additional orientation thereof to attain better correspondence with the orientation of the body of a stringed musical instrument. In a preferred embodiment, the block support member 290 comprises a pair of dove tail neck block members 295, 300 and a dovetail rail member 310. The dovetail neck block members 295, 300 are slidingly received by the dovetail rail member 310 and are adapted to support the neck of the stringed musical instrument. The dovetail rail member is supported by supports 292 and 294. In a preferred embodiment, the rail member 310 is pivotally supported by 292 and 294 at pivot point designated by reference character 293. Further, it may be removeably secured with retaining pins (not shown).

As a further feature, restraining means 320 (shown in FIG. 5) are provided for purposes os securing the stringed musical instrument 20 to the body support member 60 of the neck support member 70 or both. For example, such restraining means 320 include restraining straps. Buttons 321 are provided on body support members 60 for anchoring the restraining straps. To facilitate anchoring of the restraining straps, restraining straps are provided with strap apertures 323 for receiving insertion of buttons 321. In this respect, buttons 321 are forced through apertures 323 to anchor the restraining straps.

FIGS. 5 through 20 illustrate various applications of the repair station.

FIG. 5 shows how the repair station 10 may be used to allow access to the body of a guitar for operations such as gluing, purfling and binding strips, repairing cracks, and general finishing. To facilitate these operations, the guitar may be supported on the neck support member 70 in such a manner as to cause the body of the guitar to suspended in mid-air. To facilitate this, the neck is supported on neck support member 70 and fixed in place with restraining means 320. Further, the neck support member 70 is manipulated such that the body of the guitar is suspended above the body support member 60, permitting access above and below the guitar body's top and back.

Figure 6:
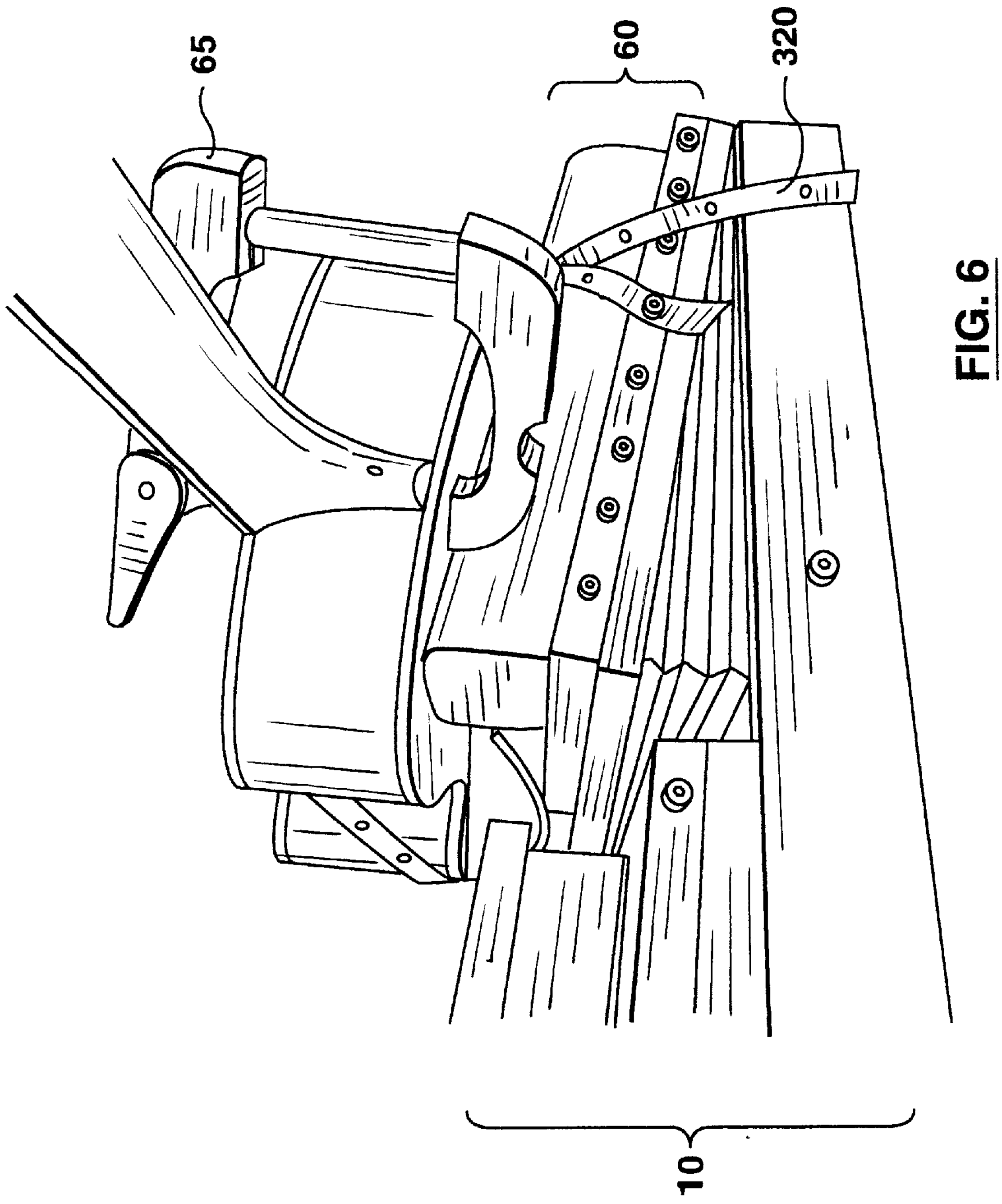
FIG. 6 is a cut-away perspective side view of the repair station of FIG. 1 showing a guitar secured to the body support member of FIG. 2 with retaining means (not part of the invention) illustrated.

FIG. 6 illustrates how a guitar neck may be glued to a guitar body while the guitar body is supported on the repair station 10. The guitar body is shown secured to the body support member 60 with restraining straps 320. A guitar neck is shown secured to the guitar body with conventional clamp, for the purposes of facilitating the bonding process between the guitar body and the guitar neck.

Figure 7:
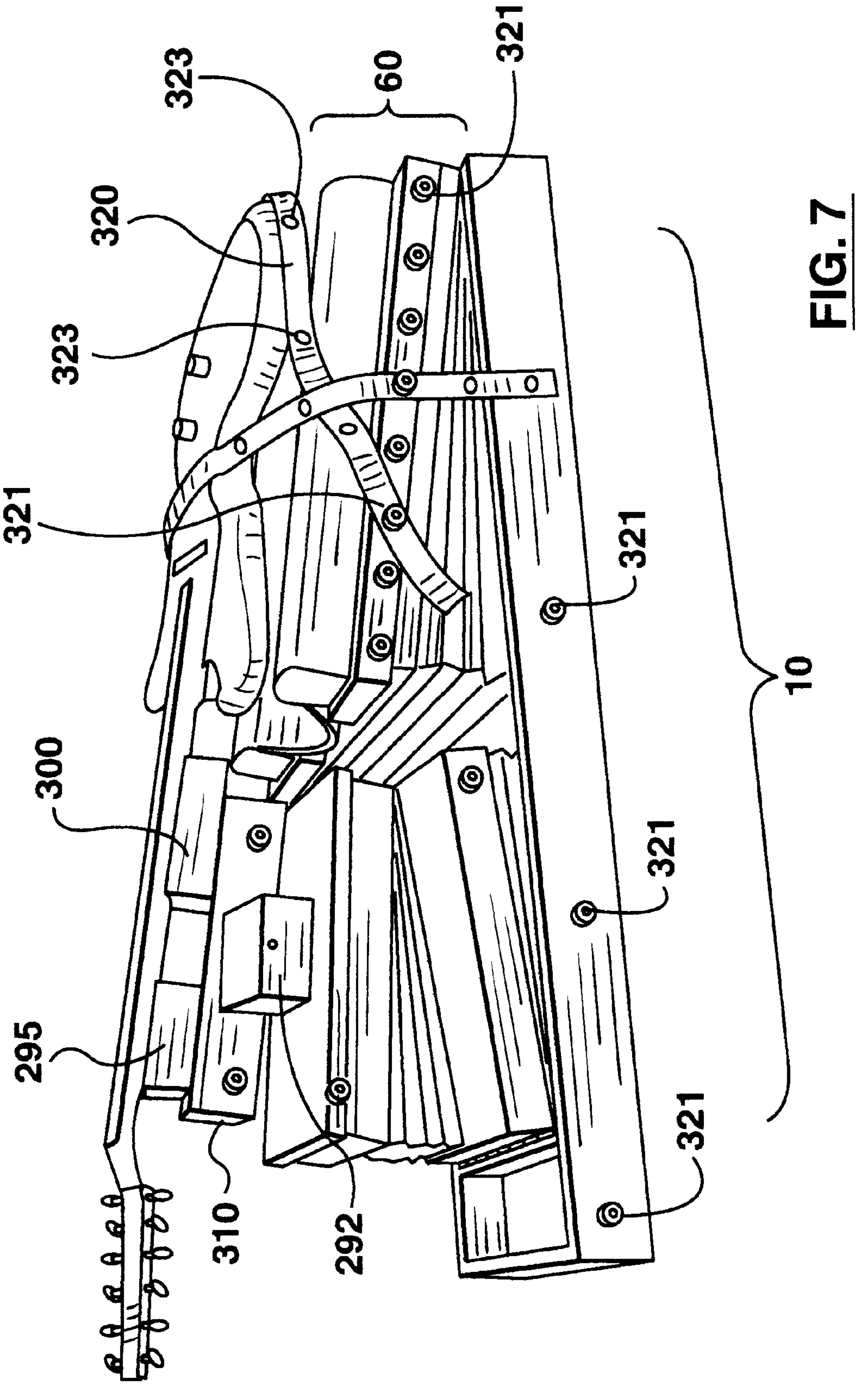
FIG. 7 is an elevated perspective side view of the repair station of FIG. 1 showing an electric guitar supported on the body support member and neck support member of the repair station, and also showing the electric guitar secured to the repair station with restraining straps.

FIG. 7 shows an electric guitar supported on the repair station 10 for purposes of performing operations on its finger board. In this respect, the electric guitar body is secured to the body support member 60 with restraining means 320, and the electric guitar neck is shown freely supported on the neck support member.

Figure 8:
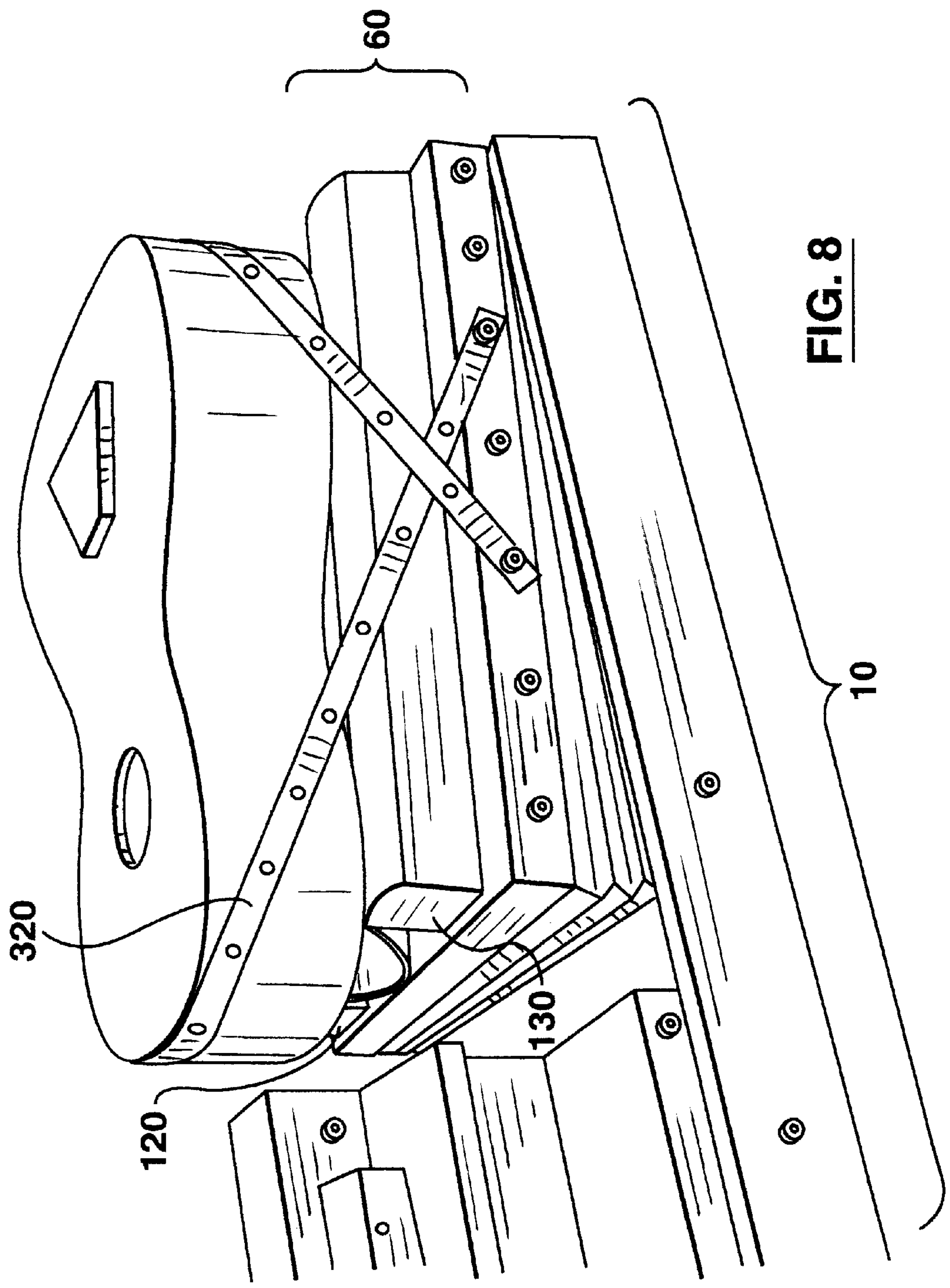
FIG. 8 is a cut-away elevated perspective side view of the repair station of FIG. 1 showing an acoustic guitar body supported on the body support member of the repair station and secured to the repair station with restraining straps.

In FIG 8, an acoustic guitar body is shown on the repair station 10. In preparation for sanding operations on the sound board of the acoustic guitar. The back surface of the acoustic guitar body is supported on the body support member 60, and the acoustic guitar body is secured by means of restraining means 320 encircling the sides of the acoustic guitar body. The elastic member 170 is not illustrated in this embodiment.

Figure 9:
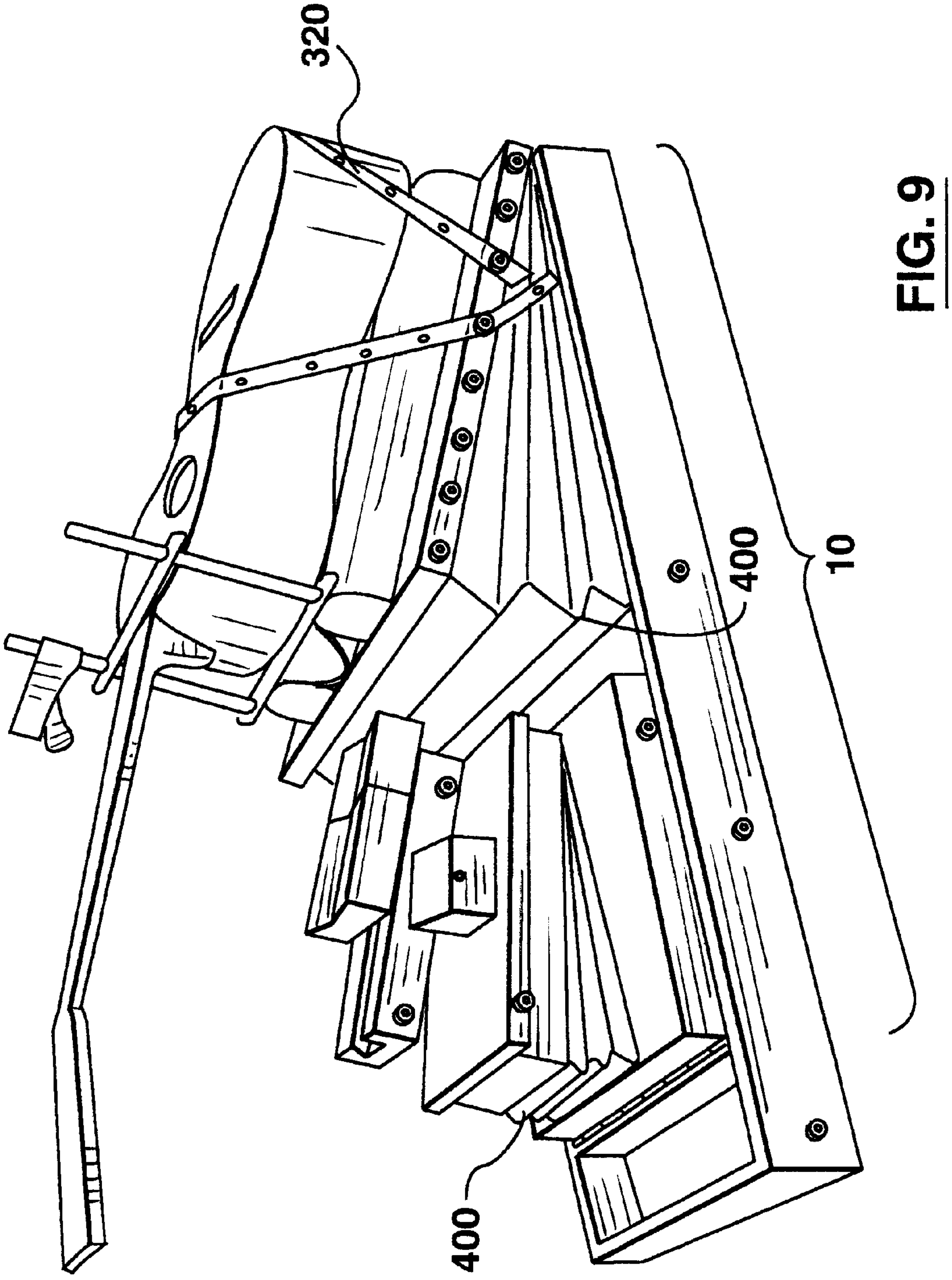
FIG. 9 is an elevated perspective side view of the repair station of FIG. 1 showing a guitar supported on the body support member of the repair station illustrating an exemplary setup for purposes of gluing a guitar neck to a guitar body.

FIG. 9 illustrates an alternative method of gluing a guitar neck to a guitar body on the repair station 10. Also illustrated as an alternative embodiment are bellows-type material 400 disposed between the support member 50 and support member 60, and, first and second parts of the neck support member. This bellows-type material may also be disposed between the support member 50 and first part 180 of the neck support member (see FIG. 12).

Figure 10:
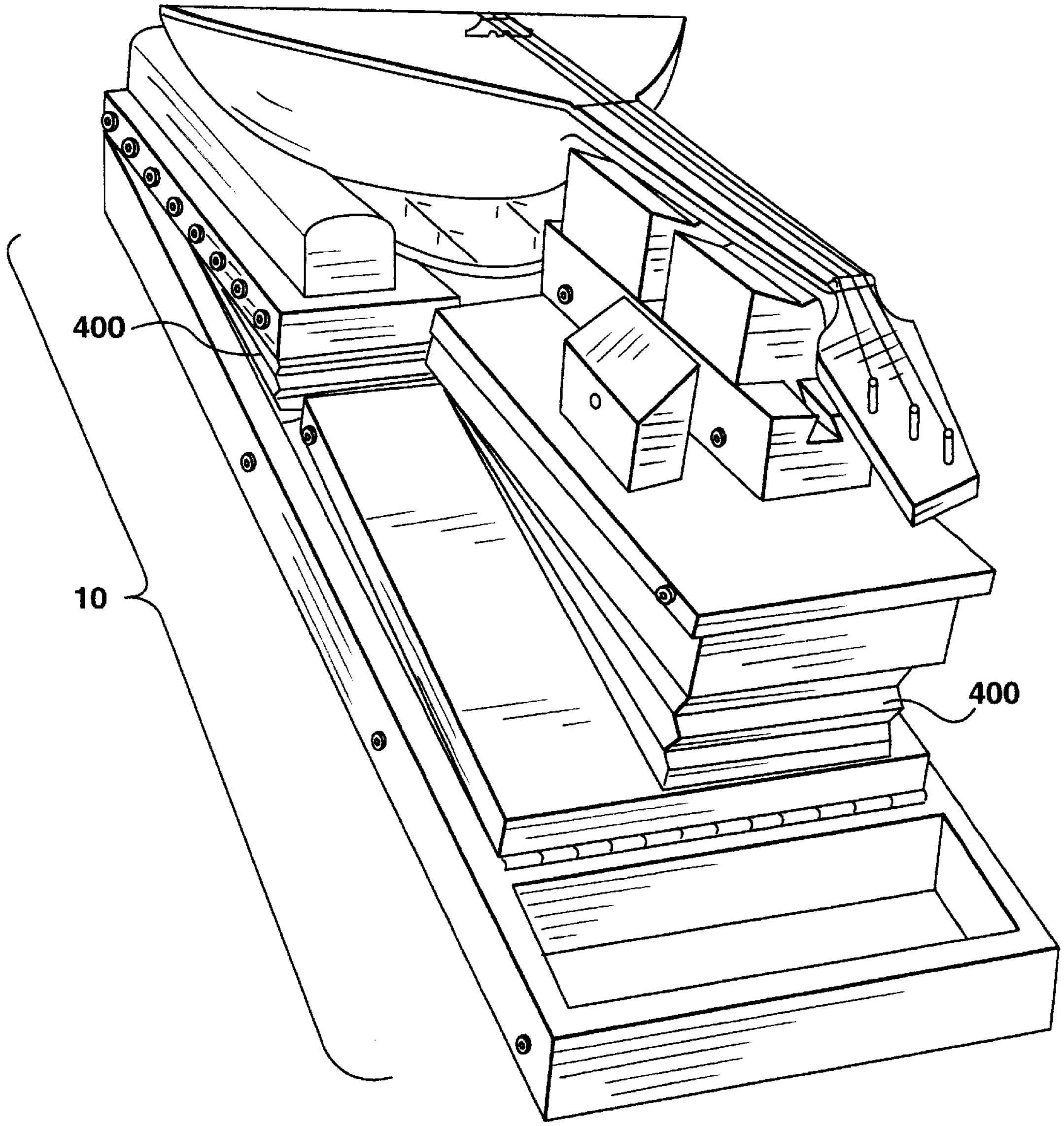
FIG. 10 is an elevated perspective view from the neck support end of the repair station of FIG. 1 showing a round-backed balalaika supported on the repair station.

FIG. 10 depicts the repair station 10 supporting a round-backed balalalka.

Figure 11:
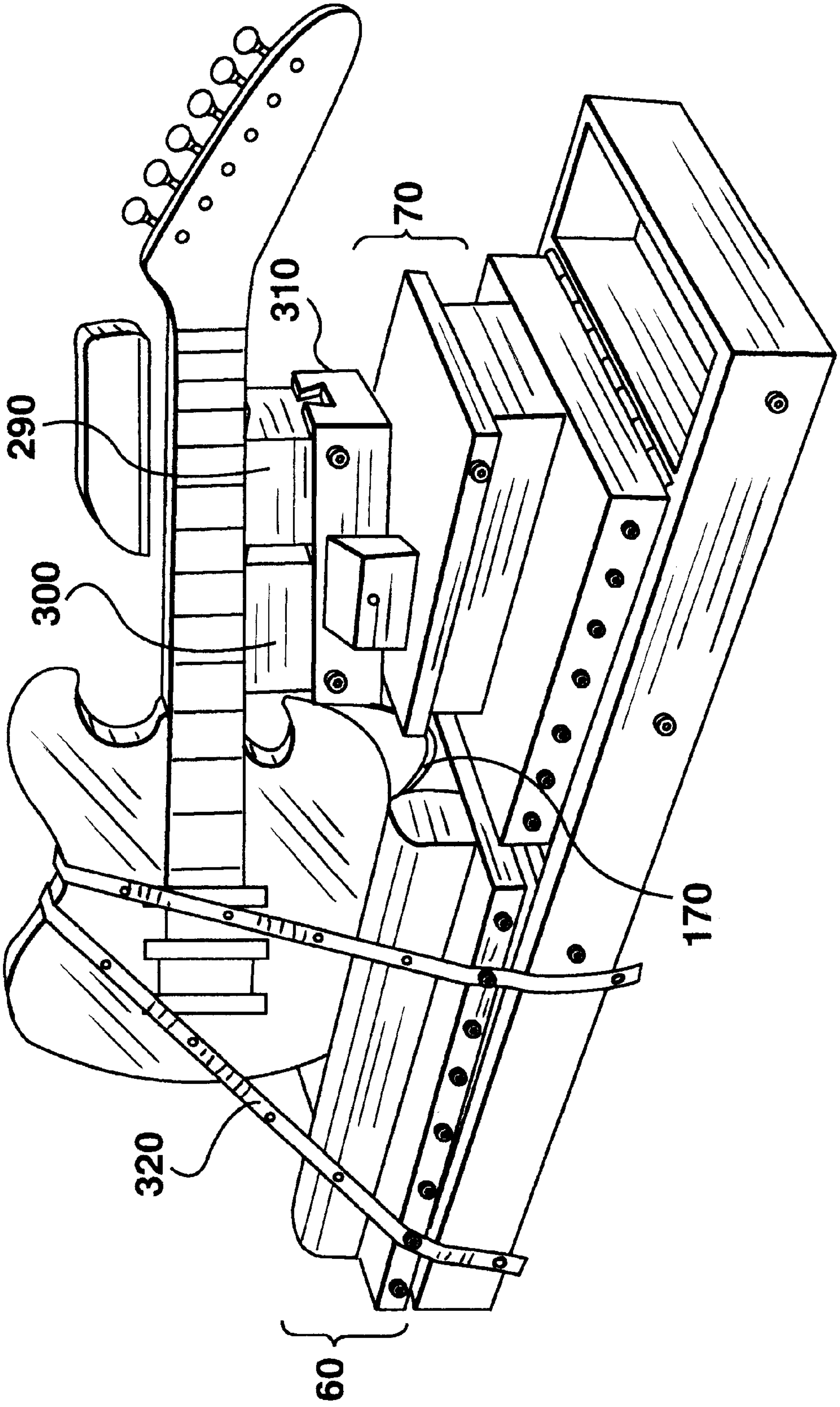
FIG. 11 is an elevated side perspective view of the repair station of FIG. 1 showing and electric guitar secured by restraining straps to and supported on its side by the repair station for purposes of filing the edges of the frets flush with the side surface of the finger board.

In FIG. 11, an electric guitar is supported on the repair station 10 for purposes of filling the edges of the frets flush with the side surface of the fingerboard. To facilitate this, the electric guitar body and neck are supported on their sides by the body support member 60 and the neck support member 70 respectively. The electric guitar body is supported on the elastic support member 170 and secured to the body support member 60 with restraining means 320. The electric guitar neck is freely supported on the neck support member 70 at a desired angle from the horizontal to permit the necessary operation.

FIG. 12 depicts an acoustic guitar whose finger board is being leveled with a wood plane 500, while the acoustic guitar is supported on the repair station 10.

Figure 13:
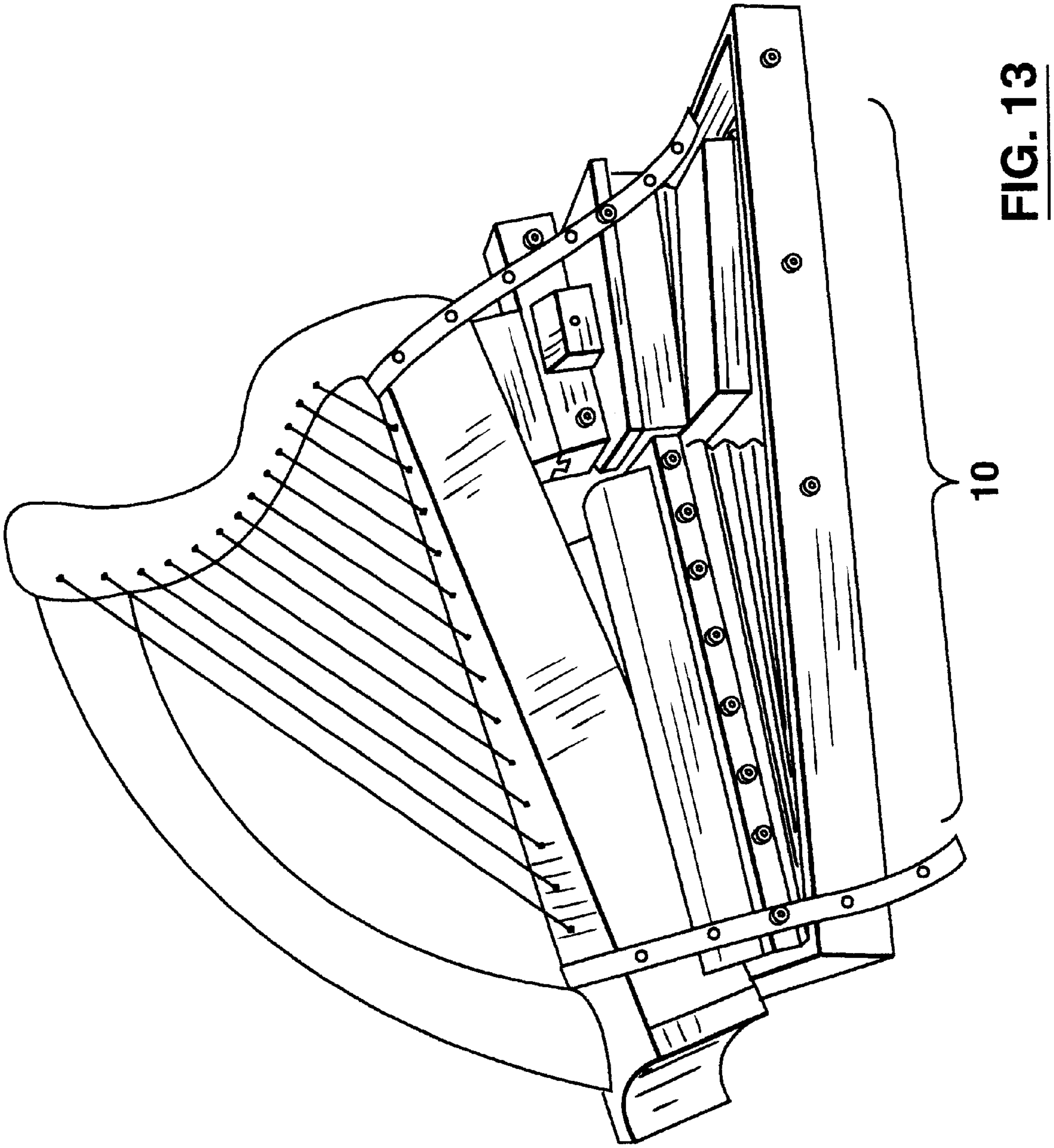
FIG. 13 is an elevated perspective side view of the repair station of FIG. 1 showing a Coltio Harp secured with restraining straps to and supported on the repair station.

FIG. 13 shows a Celtic Harp supported in position on the repair station 10 for purposes of restraining.

To further illustrate the suitability of the repair station for a wide-range of instruments, FIGS. 14 and 15 show the repair station 10 being used to support a banjo and a violin, respectively.

Figure 16:
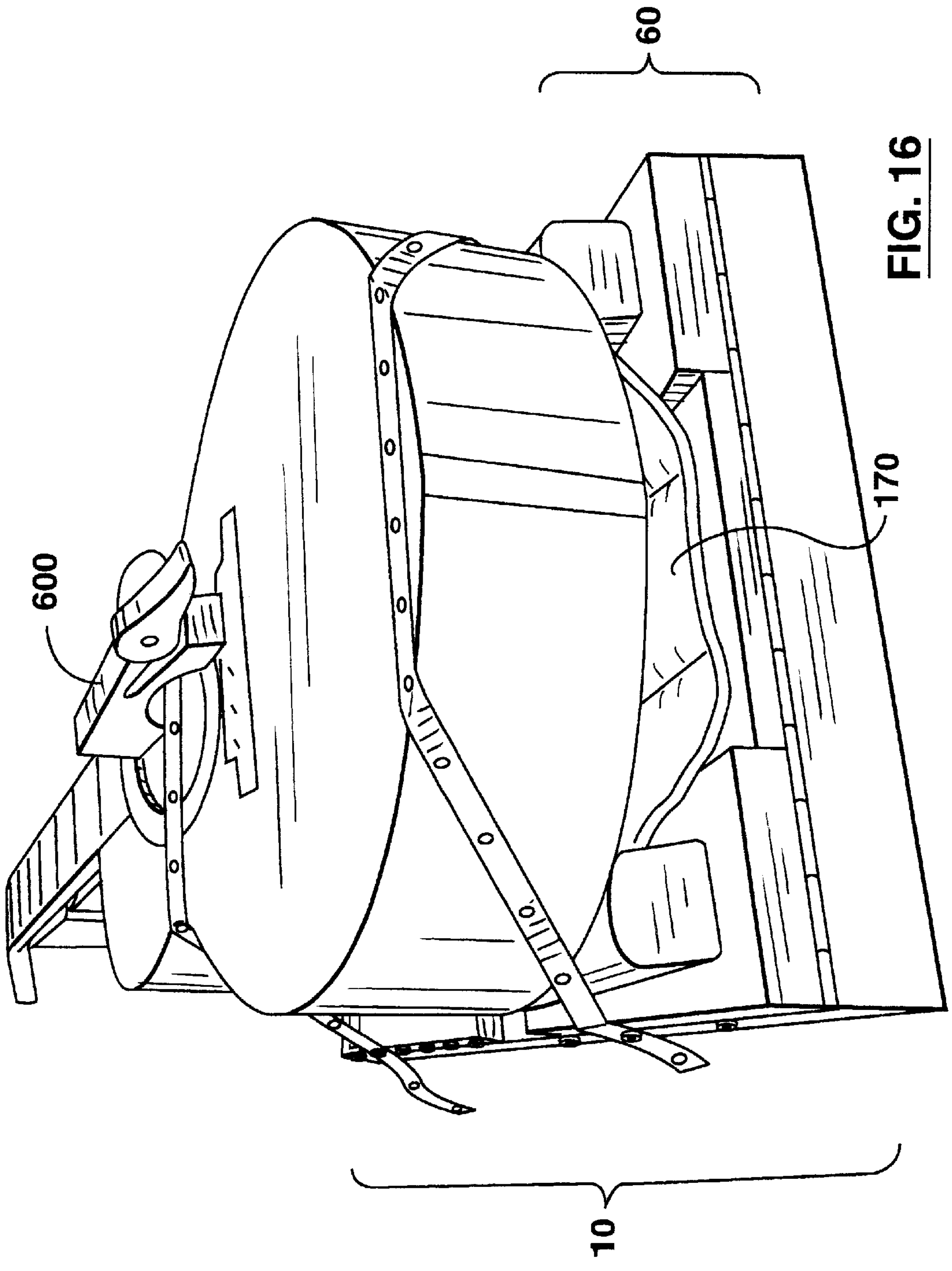
FIG. 16 is an elevated perspective view from the body support end of the repair station of FIG. 1, showing an acoustic guitar secured with restraining straps to and supported on the repair station illustrating an exemplary setup for purposes of gluing a guitar bridge to the acoustic guitar.

In FIG. 16, an acoustic guitar is shown secured and supported on the body support member 60 of the repair station 10 for purposes of gluing a guitar bridge to the acoustic guitar with the use of a bridge clamp 600.

Figure 17:
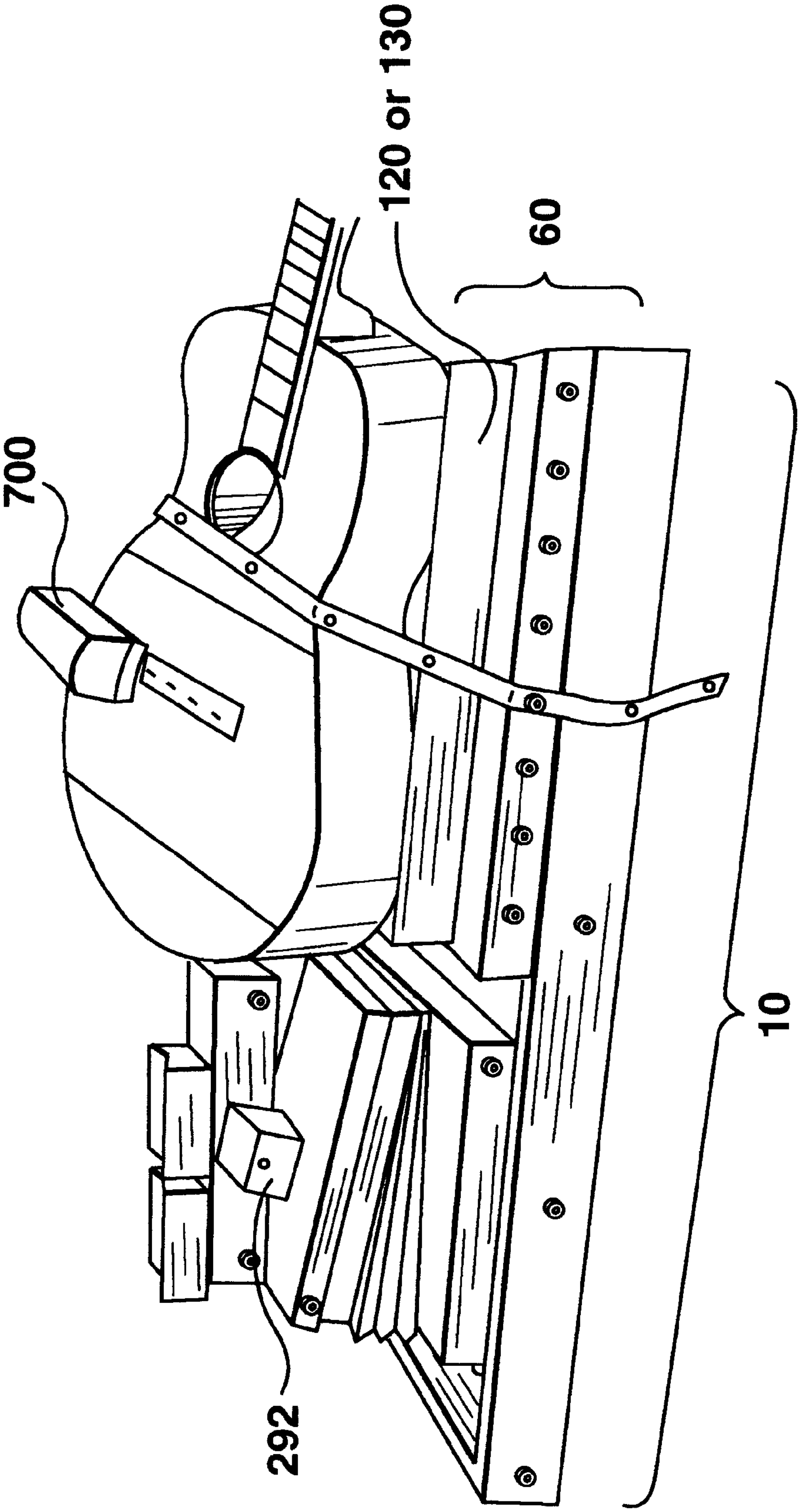
FIG. 17 is an elevated perspective side view of the repair station of FIG. 1, showing an acoustic guitar secured and supported on the repair station wherein one side of the acoustic guitar has been urged against the vertical sidewall member of the body support member.

In FIG. 17, an acoustic guitar is shown supported on the repair station 10 for purposes of planing the bridge on the acoustic guitar with a bridge plane 700. To facilitate this, the body of the acoustic guitar is secured to the repair stat 10 such that one side of the acoustic guitar body is urged against the spaced apart opposing rail members 120 or 130 of the body support member 60.

FIG. 18 shows a guitar body suspended on the repair station 10 in mid-air by its neck to facilitate spray finishing of the guitar body.

Figure 19:
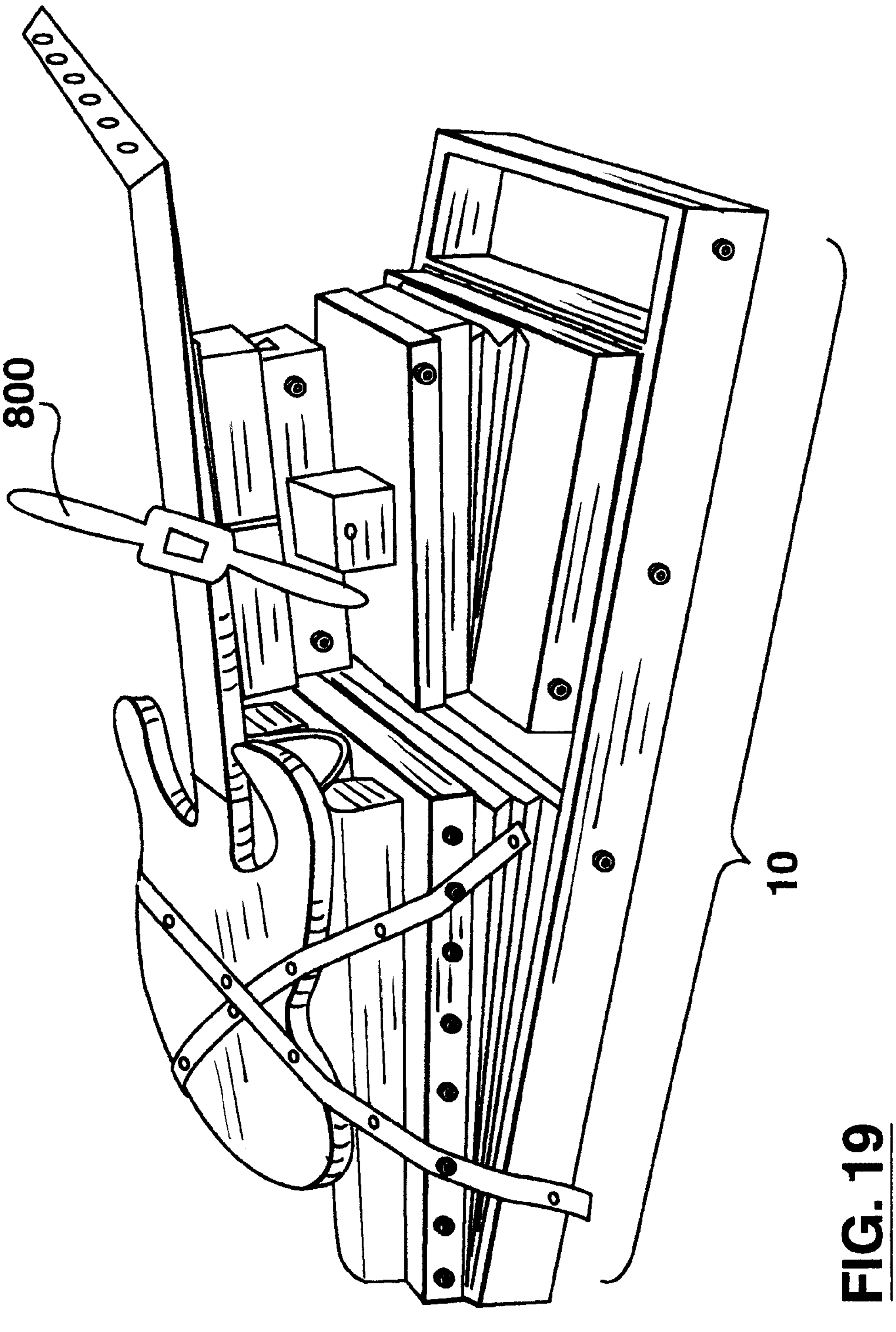
FIG. 19 is an elevated perspective side view of the repair station of FIG. 1 showing a guitar secured and supported on the repair station illustrating an exemplary setup for purposes of shaping the guitar neck with a spoke shave.

FIG. 19 depicts the back of a guitar neck being shaped by a spoke shave 800 on the repair station 10. The spoke shave is shown at mid-section of the guitar neck.

Figure 20:
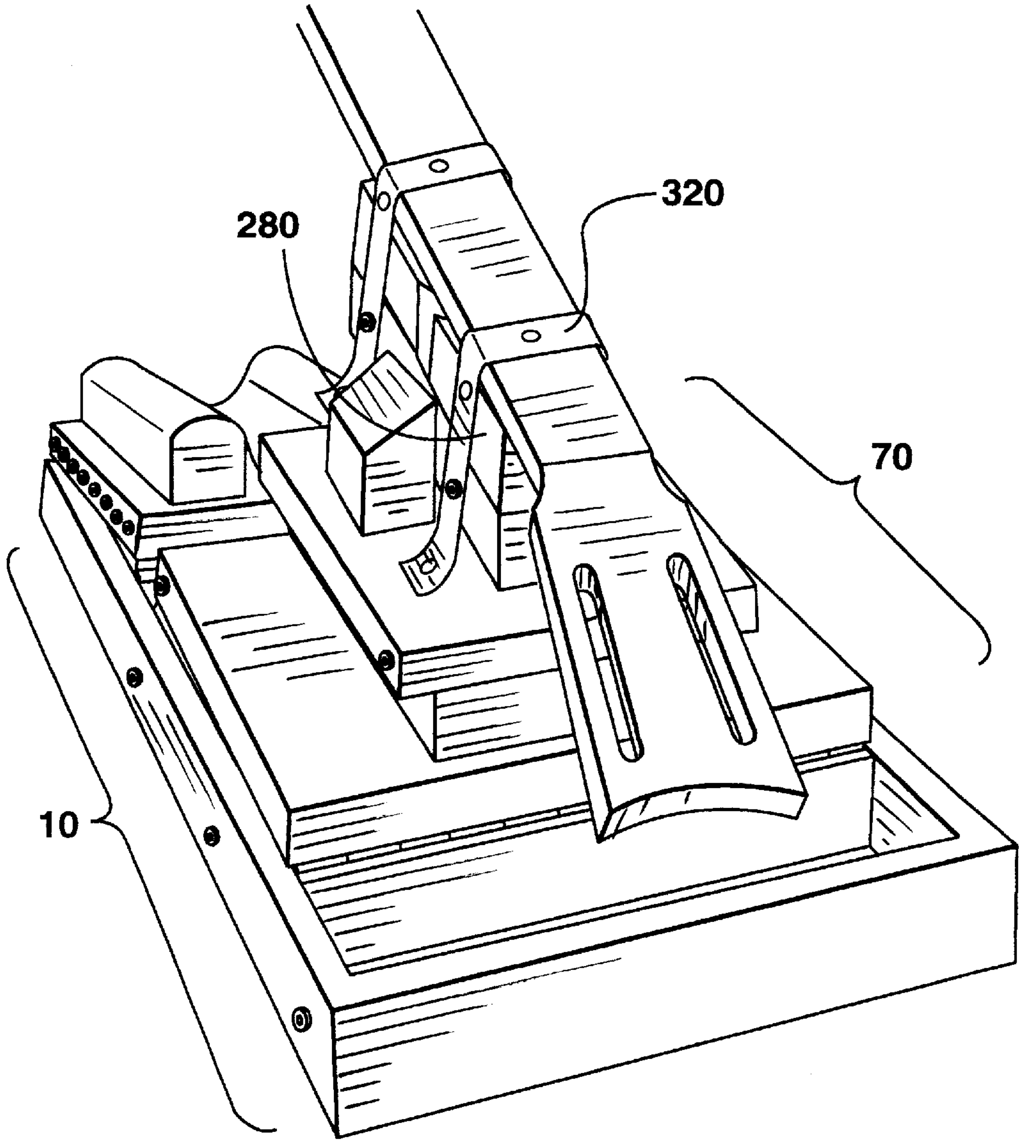
FIG. 20 is an elevated perspective view from the neck support end of the repairs station showing a guitar neck secured and supported on the neck support member illustrating an exemplary setup for the purposes of final detail sanding of the head stock and installation of the tuning machines.

Finally, FIG. 20 shows a guitar neck secured to the repair station 10 for the final detail sanding of the head stock and installation of the tuning machines. In this respect, the guitar neck is supported on the block support member 280 and secured to the neck support member 70 with restraining means 320.

Although the disclosure describes and illustrates preferred embodiments of the invention, it is to be understood that the invention is not limited to these particular embodiments. Many variations and modifications will now occur to those skilled in the art.

I claim:

1. A stringed instrument workstation for supporting a stringed musical instrument having a body and a neck, comprising:

a body support member for supporting the body of the stringed musical instrument; and a neck support member adapted for supporting the neck of the stringed musical instrument, said neck support member including a neck platform member, a dovetail rail member and a dovetail neck block member, said dovetail neck block member slidingly received by said dovetail rail member, said dovetail rail member being pivotally coupled to said neck platform member.

2. The stringed instrument workstation of claim 1, wherein said body support member is comprised of a plurality of rigid members which define a first free region of space, and wherein an elastic support member is provided within said firs free region of space.

3. The stringed instrument workstation of claim 1, wherein said body support member includes vertically extending spaced apart opposing rail members extending upwardly on either side of said body support member for supporting the stringed musical instrument.

4. The stringed instrument workstation of claim 3, wherein said body support member is comprised of a plurality of rigid members which define a first free region of space, and wherein an elastic support member is provided within said first free region space.

5. A stringed instrument workstation, for supporting a stringed musical instrument having a body and a neck, comprising:

a frame member;

a body support member, pivotally coupled to said frame member; said body support member adapted to support said body of said stringed musical instrument;

first adjustable support means for supporting said body support member;

first and second neck support members;

said first and second neck support members adapted to support said neck of said stringed musical instrument;

said first neck support member pivotally coupled at one end thereof to said frame member and at opposite end thereof to said second neck support member;

second adjustable support means for supporting of said first neck support means by said frame member; and third adjustable support means for supporting of said second neck support means by said first neck means.

6. The stringed instrument workstation claim 5, wherein said workstation includes restraining means for securing said stringed musical instrument to said workstation.

7. The stringed instrument workstation claim 6, wherein said second neck support member includes a dovetail rail member and dovetail neck block members, said dovetail neck block members slidingly received by said dovetail rail member and adapted to support said neck.

8. The stringed instrument workstation of claim 7, wherein said dovetail rail member is pivotally coupled to said neck platform member.

9. The stringed instrument workstation of claim 8, wherein said body support member is comprised of a plurality of rigid members which define a first free region of space, and wherein an elastic support member is provided within said firs free region of space.

10. The stringed instrument workstation of claim 9, wherein said body support member includes vertically extending spaced apart opposing rail members extending upwardly on either side of said body support member for supporting the stringed musical instrument.

11. A stringed musical instrument workstation for supporting a stringed musical instrument with a body and a neck, comprising:

a vertically positionable and tiltable body support surface adapted to support the body of the stringed musical instrument, the body support surface including vertically extending spaced apart opposing rail members extending upwardly on either side of said body support surface for supporting the stringed musical instrument workstation; and a vertically positionable and titlable neck support surface adapted to support the neck of the stringed musical instrument, the neck support surface being vertically positionable and tiltable independently of the body support surface.

12. The stringed musical instrument workstation of claim 11 wherein said body support surface is characterized by a second axis of pivotal rotation, wherein said second axis of pivotal rotation is vertically positionable independently of said first axis of pivotal rotation.

13. The stringed musical instrument workstation of claim 11 wherein said body support surface is characterized by a first end and a second end, and wherein each of said real members extends from about said first end to about said second end, and wherein spacing between said rail members is narrower at said first end than at said second end.

14. A stringed musical instrument workstation for supporting a stringed musical instrument having a body and a neck, comprising:

a body support member adapted to support the body of the stringed musical instrument; and a neck support member including a dovetail rail member and a plurality of dovetail neck block members, said neck block members slidingly received by said rail member, said neck block members adapted to support the neck of the stringed musical instrument.

15. A stringed musical instrument workstation for supporting a stringed musical instrument having a body and neck, comprising:

a frame;

a body support member coupled to said frame and adapted to support the body of the stringed musical instrument;

a neck support member coupled to said frame and adapted to support the neck of the stringed musical instrument;

a plurality of buttons; and a restraining strap for securing the body of the stringed musical instrument against said body support member wherein said restraining strap is anchored by said buttons.

16. The stringed musical instrument workstation of claim 15 wherein said restraining strap includes apertures for receiving insertion of said buttons.

17. A stringed musical instrument workstation for supporting a stringed musical instrument with a body and a neck, comprising:

a vertically positionable and tiltable body support member adapted to support the body of the stringed musical instrument; and a vertically positionable and tiltable neck support member adapted to support the neck of the stringed musical instrument;

wherein said body support member is comprised of a perimeter for defining a first free region of space, and wherein an elastic support member extends across said first free region of space.

18. A stringed musical instrument workstation for supporting a stringed musical instrument with a body including a front side and a back side, comprising:

a frame;

a body support surface pivotally coupled to the frame and adapted to support the body of the stringed musical instrument;

first and second spaced apart opposing rail members extending upwardly from the body support surface, each of the first and second rail members presenting an upper surface for providing vertical support to the front side or back side of the stringed musical instrument, the first and second spaced apart opposing rail members defining a free region of space above the body support surface therebetween.

19. The stringed musical instrument workstation of claim 18 wherein the body support surface is characterized by a first end and a second end, and wherein each of the first and second spaced apart opposing rail members extends from about the first end to about the second end, such that the spacing between the first and second rail members is narrower at the first end than at the second end.

* * * * *